United States Patent [19]

Westerman, II

[11] 4,257,402
[45] Mar. 24, 1981

[54] EVACUATED SOLAR RECEIVER UTILIZING A HEAT PIPE

[75] Inventor: William J. Westerman, II, Waterloo, Iowa

[73] Assignee: Chamberlain Manufacturing Corporation, Elmhurst, Ill.

[21] Appl. No.: 79,073

[22] Filed: Sep. 26, 1979

[51] Int. Cl.³ ............................................. F24J 3/02
[52] U.S. Cl. ............................... 126/443; 126/901; 165/179
[58] Field of Search ................... 126/443, 446, 901; 165/179

[56] References Cited

U.S. PATENT DOCUMENTS

| | | | |
|---|---|---|---|
| 2,917,817 | 12/1959 | Tabor | 126/901 X |
| 3,129,703 | 4/1964 | Tabor | 126/901 X |
| 3,176,678 | 4/1965 | Langley | 126/901 X |
| 3,176,679 | 4/1965 | Langley | 126/901 X |
| 4,069,812 | 1/1978 | O'Neill | 126/271 |
| 4,078,944 | 3/1978 | Mlavsky | 136/89 H |
| 4,124,019 | 11/1978 | Heffelfinger | 126/271 |
| 4,190,036 | 2/1980 | Miedermeyer | 126/439 |

Primary Examiner—William E. Tapolcai, Jr.
Attorney, Agent, or Firm—Hill, Van Santen, Steadman, Chiara & Simpson

[57] ABSTRACT

A solar receiver in which a rod of high thermal conductivity is mounted in an evacuated envelope so as to receive thermal energy and which is coated with a selective absorbing surface so as to minimize radiation has a heat transfer end which is surrounded by a suitable material such as pyroceram or porcelain or other suitable material which extends into a container from which the heat produced by the solar energy is removed. The glass envelope surrounding the rod is attached by welding to the pyroceram cylinder and the heat transfer cavity is connected with an O-ring to the pyroceram cylinder so as to provide a liquid seal.

14 Claims, 4 Drawing Figures

U.S. Patent   Mar. 24, 1981   4,257,402
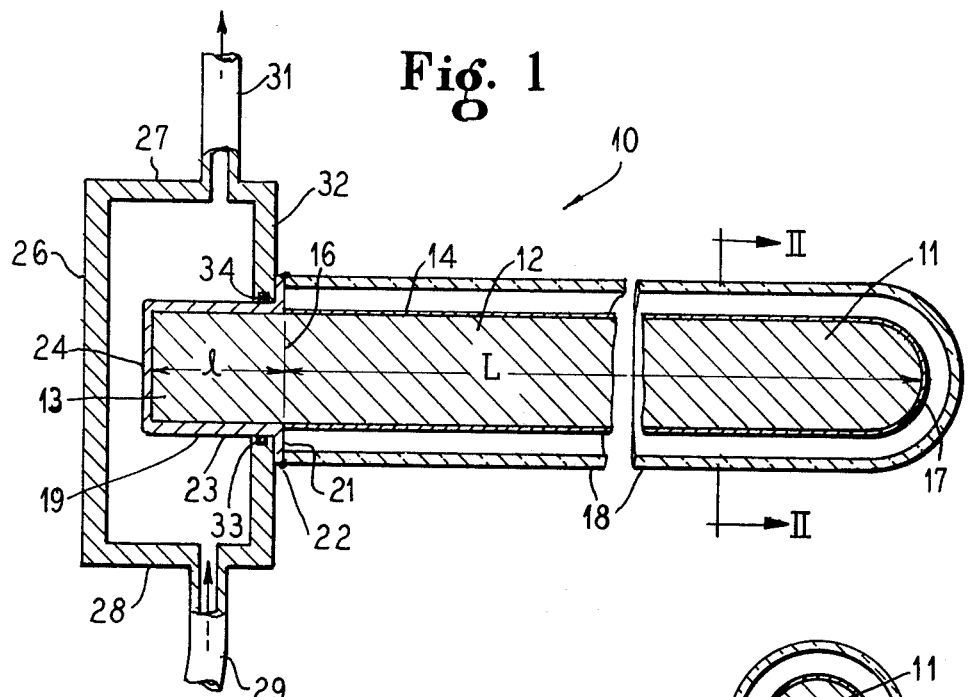
Fig. 1
Fig. 2
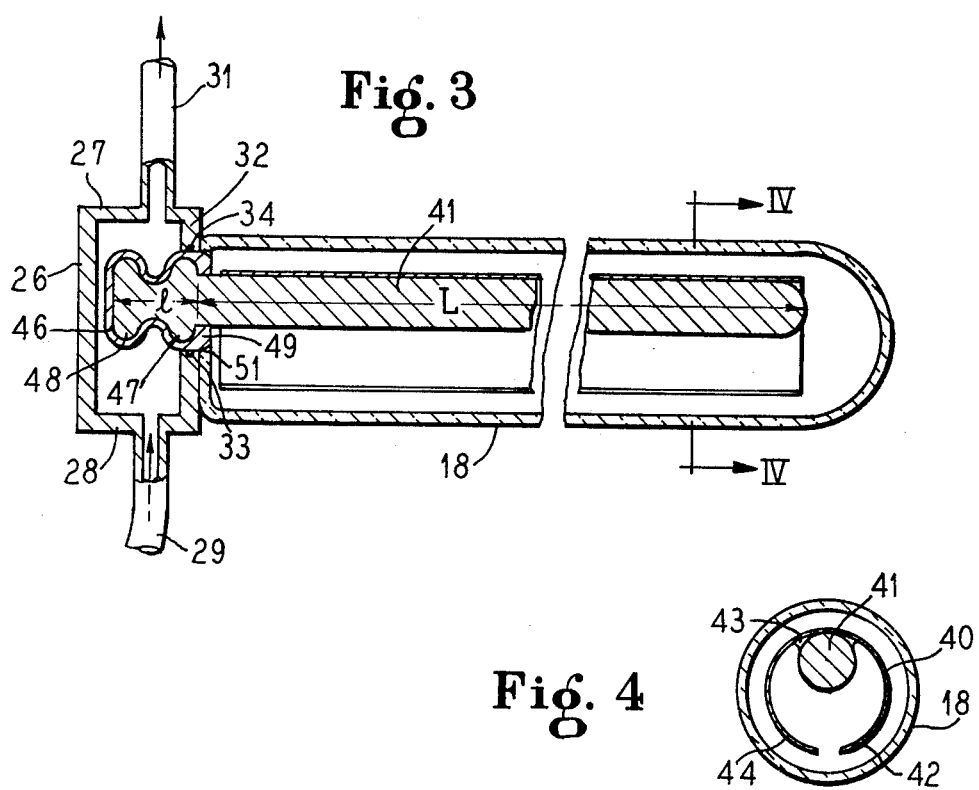
Fig. 3
Fig. 4

EVACUATED SOLAR RECEIVER UTILIZING A HEAT PIPE

BACKGROUND OF THE INVENTION

1. Field of the Invention

This invention relates in general to solar receivers and in particular to a novel solar receiver of high efficiency.

2. Description of the Prior Art

In a solar collector, it is possible to absorb about 99% of the available energy, however, subsequent losses severely degrade the overall collector efficiency. These losses become greater as the operating temperature increases.

When solar radiation is absorbed by a conventional flat plate absorber, the absorber surface becomes hotter than its surroundings and gives up its heat not only to the working fluid but also to the environment through convection, conduction and reradiation. A glass plate is commonly placed over the absorber to minimize the convection losses. A selective surface such as a black chrome plating is often applied to the absorber so as to reduce and minimize the reradiation losses by reducing the emissivity of the plate while maintaining the absorbitivity at a high level. Such techniques are effective up to about 180° F. operating temperature. Concentrating collectors are used above this temperature to further minimize the reradiation losses by reducing the area over which reradiation occurs. This improvement is somewhat marginal but generally allows reasonable efficient operation up to roughly 220° F.

Above 200° to 250° F. it is necessary to enclose the absorber in a high vacuum which will virtually eliminate convective and conduction losses. Conventional approaches using evacuated receivers require glass to metal seals which are expensive and unreliable. Generally, glass to metal seals are accomplished by using a material which has a coefficient of expansion halfway between that of glass and metal but such seals become very unreliable over a period of time when the metal portion has a large characteristic dimension such as the diameter of the tube which carries the liquid through the collector and when the temperature cycle is over a large range. Both of these conditions exist in solar collectors of the prior art.

It has been known in the prior art to provide two concentric tubes which are welded at one end and between which a vacuum is maintained. However, such apparatuses have several disadvantages in that the sun light must go through two separate thicknesses of glasses with a 10% loss through each thickness. Also, the inside glass tube reaches a temperature equivalent to the absorber surface which might be as high as 300° F. and at this temperature the emissivity of the glass is very high which reduces and negates the advantage of applying a selective coating on the absorber surface.

It is also known to provide a receiver which comprises a pair of layers of glass separated by vacuum with a selective coating on the outside diameter of the inner tube. The sun light passes through one thickness of glass and is absorbed and the inner tube becomes hot and transfers its heat to a metal member which is in intimate contact with the inner glass tube. Generally, however, the metal does not contact the glass as well as desired and losses occur. It is very difficult to apply a selective emissivity coating to glass which will withstand hard vacuum and high temperature.

SUMMARY OF THE INVENTION

In the present invention, fluid conducting pipes are not required in the portion of the solar collector which is heated by the solar energy in that a metal rod is enclosed in a vacuum envelope and is coated with a selective surface coating so as to increase the absorption of energy but to reduce the reradiation of energy. The heat is removed from the rod in an area which is surrounded by a suitable fluid and the rod in this portion is surrounded by a pyroceram, glass, or porcelain cylinder which can be easily welded to the glass envelope and which can make a fluid seal with the heat removing cavity. A modification of the invention provides that the heat conducting rod has a smaller diameter than the rod of the first embodiment and is connected to a generally crescent shape fin which is welded or soldered to the heat rod so as to allow the use of a smaller diameter heat rod. This embodiment also utilizes a heat transfer portion of the pipe which is of bellows configuration so as to increase the surface area in which the heat can be removed from the heat rod.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a sectional view through the invention;
FIG. 2 is a sectional view taken on line II—II;
FIG. 3 illustrates a modification of the invention; and
FIG. 4 illustrates a sectional view taken on line IV—IV in FIG. 3.

DESCRIPTION OF THE PREFERRED EMBODIMENTS

A first embodiment of the invention is illustrated in FIGS. 1 and 2 in which a heat rod having a length of L+l is mounted so that it receives energy such as solar energy over the length L and the heat flows through the heat rod into the length l wherein the heat is removed due to its contact with liquid through a porcelain or pyroceram covering. The heat rod has a selective absorbing surface over the length L so as to increase the absorptivity of the thermal energy but to reduce the reradiation of thermal energy.

The heat removal portion having a length l is encased in a glass or ceramic cylinder having a relatively high heat conductivity. Such materials as pyroceram, porcelain or other suitable materials may be used for this purpose. A low iron glass tube is welded to the encasing material and a hard vacuum is drawn inside the tube. Appropriate fins can be added to the heat rod if desired.

The important features of the invention are:
(1) There are no "pass throughs" for fluid into or out of the hard vacuum region.
(2) The selective surface coating can be applied to a suitable metal rod such as stainless steel, steel, copper, or a similar material.
(3) The sun light energy need only pass through one thickness of glass before being absorbed.
(4) The glass does not get extremely hot.

In a particular embodiment constructed of the invention, a heat rod which can be produced at a reasonable cost in which the heat absorbing length L is 48 inches and the heat transfer length is approximately 5 inches was utilized.

A high heat conductivity glass or ceramic can be easily bonded to the heat removable end (the length l) of the heat rod.

Low iron content glass can be welded to the ceramic.

A selective coating which will increase the absorption of energy but which will reduce the reradiation of energy can be easily applied to the heat rod and such coating will not degrade in high vacuum.

The assembly will operate with minimum temperature loss.

With the heat rod having a length of 51 inches as defined above, it was determined that it would operate with approximately a 2° F. temperature drop. A material called "Pyroceram" made by Corning Glass Company can be used as the material which surrounds the heat rod in the heat transfer region. "Pyroceram" has a coefficient of thermal conductivity of 2.10 BTU/sq. ft./hr./°F./ft. which is much higher than standard glass which has a coefficient of 0.5.

Various oxide coatings can be applied to metals and such coatings will survive a hard vacuum and reduce reradiation and increase the absorption of energy.

The invention operates with a temperature drop or loss through the heat rod of about 2° F. maximum. Heat can then be removed from the short length l through the pyroceram and into the fluid. In a particular example wherein the heat rod had a diameter of 2 inches, a length of 48 inches in the heat receiving region and a length of 3 inches in the heat transfer region and using a thickness of pyroceram of 0.3 inches then:

$\dot{Q} = Ah\Delta T/t$
(300 BTU/sq.ft./hr.)(4 ft.)(9/12 ft.) =

$$900 \text{ BTU/hr} = \frac{(\pi Dl + \pi/4 D^2 \text{ ft.}^2)(2.1 \text{ BTU/sq.ft./°F./ft.})(\Delta T)}{.030/12 \text{ ft.}}$$

$$= \frac{[\pi 2/12 \, 3/12 + \pi/4 \, (2/12)^2] \, [2.1] \, [\Delta T]}{.030/12}$$

$$= \frac{[.131 + .022] \, [2.1] \, [\Delta T]}{.0025}$$

$\Delta T = 7.00°$ F.

Thus, the temperature difference across the pyroceram can be expected to be in the order of 7° F. at maximum isolation and with a 2° F. drop along the length of the heat rod a total temperature loss of 9° F. will result. This is much better than apparatuses of the prior art.

FIGS. 1 and 2 illustrate a heat rod 11 that may be made of stainless steel or steel copper which has a length L that extends into the heat receiving portion of a solar collector and a shorter portion l which extends into a heat removable portion of the device. In a typical example L may be 48 inches and l may be 3 inches and the diameter of the rod 11 may be 2 inches. A coating 14 is applied over the surface of the rod 11 in the heat absorbing region so as to minimize reradiation and to increase the absorption of heat energy. The coating might, for example, be a suitable oxide. The end 13 of the rod 11 is received in a hollow cylindrical member 19 that has a flange 21 and an end 24. The portion 13 of the rod 11 is mounted in the member 19 so it has intimate contact therewith to provide good heat transfer characteristics. The cylinder 19 may be made of porcelain or pyroceram which has a high thermal conductivity characteristic. A glass envelope 18 is welded as by the use of a glass weld to the flange 21 of the cylinder 19 and the air space between the outer surface of the rod 11 and the glass envelope 18 is evacuated so as to reduce conduction and convection in the space between the rod and the glass envelope, thus, minimizing heat losses.

A liquid manifold having sidewalls 26 and 32 and end walls 27 and 28 surrounds the member 19 so as to remove heat from the rod over the portion l by passing fluid over it. The fluid enters the manifold through an input conduit 29 and is removed from the manifold through an output conduit 31. A groove 33 is formed in the wall 32 of the manifold 26 and an O-ring 34 is mounted in the groove so as to provide a fluid tight seal between the manifold and the cylindrical member 19.

In operation, the heat rod 11 is subjected to incoming thermal (solar) energy over its length L. This heat is transferred into length L and section 13 by the normal action of the heat rod. The heat is then transferred through the member 19 and into the fluid in the manifold 26. The fluid in manifold 26 is thereby heated and is removed through the outlet conduit 31.

It is to be particularly noted that the rod 11 has a high thermal conductivity and it is mounted in a vacuum sealed envelope which substantially reduces convection and conduction. The rod 11 is coated to reduce reradiation. Only one layer of glass 18 is present over the rod which increases the efficiency of the device.

The heat flows from the region L of the rod to the region l where it is removed by a fluid flowing through the cylinder 23 having an end wall 24 into the fluid in the manifold 26.

The invention does not require that fluid pipes pass through the heat receiver portion of the device and thus a glass to metal seal is not required for the heat rod in the present invention.

FIGS. 3 and 4 illustrate a modification of the invention where instead of the relatively large diameter heat pipe 11 illustrated in FIGS. 1 and 2, a smaller diameter heat rod 41 is utilized and it is surrounded by a crescent shaped metal absorbing surface 40 which has crescent shaped portions 42 and 44 as illustrated in FIG. 4. The member 40 is welded to the rod 41 with a suitable weld 43. The heat transfer portion of the rod 41 is formed with bellows portions 47 and 48 which are surrounded by pyroceram or porcelain coating 46 and the bellows configuration increases the heat transfer area in the manifold 26 as compared to the embodiment illustrated in FIG. 1. The porcelain or pyroceram coating 46 is joined at its end 49 with the glass 18 with a suitable glass weld 51. The groove 33 and O-ring 34 makes a suitable fluid seal between the manifold 26 and the pyroceram or porcelain coating on the end of the rod.

In operation, the portion of the rod L is heated by the solar energy and the heat is removed in the region l of the rod by heating the fluid in the manifold and the heated fluid is removed through the conduit 31.

Although the invention has been described with respect to preferred embodiments, it is not to be so limited as changes and modifications can be made which are within the full intended scope of the invention as defined by the appended claims.

I claim as my invention:

1. A solar receiver which requires no liquid in the heat receiving region comprising an elongated member of high thermal conductivity having a heat receiving portion which extends for a substantial portion of its length and a heat transfer portion which receives the heat from said heat receiving portion and transfers it for utilization, a hollow ceramic or glass member in intimate surface contact with said heat transfer portion of said elongated member, an elongated glass envelope enclosing said heat receiving portion and attached to said ceramic or glass member to form an airtight seal, and a manifold with liquid therein into which said ceramic or glass member and said heat transfer portion extends for transferring heat to said liquid.

2. A solar receiver according to claim 1 wherein said manifold is formed with an opening through which said ceramic member and said heat transfer portion extends, and an O-ring seal formed between said manifold and ceramic member to provide a liquid seal.

3. A solar receiver according to claim 1 wherein said elongated member is metal.

4. A solar receiver according to claim 3 wherein said elongated member is steel.

5. A solar receiver according to claim 3 wherein said elongated member is steel or copper.

6. A solar receiver according to claim 1 wherein said ceramic member is porcelain.

7. A solar receiver according to claim 1 wherein said ceramic member is made of pyroceram.

8. A solar reciever according to claim 1 wherein said ceramic member is made of glass.

9. A solar receiver according to claim 1 wherein said ceramic member has a flange which is outside of said manifold and the end of said elongated glass envelope is welded to said flange to provide a fluid seal.

10. A solar receiver according to claim 1 wherein said heat receiving portion of said elongated member is coated with a material to increase energy absorption and to reduce reradiation.

11. A solar receiver according to claim 1 wherein said elongated member is generally cylindrical shaped.

12. A solar receiver according to claim 1 wherein said heat receiving portion of said elongated member is attached to crescent shaped metal heat absorbing member.

13. A solar receiver according to claim 1 wherein said heat transfer portion and said ceramic member within said manifold are bellows shaped.

14. A solar receiver according to claim 1 wherein said heat transfer portion and said ceramic member within said manifold are fin shaped.

* * * * *